Patented Sept. 25, 1945

2,385,696

UNITED STATES PATENT OFFICE 2,385,696

MANUFACTURE OF DIVINYL-BENZENE COMPOUNDS FROM CORRESPONDING ETHYLATED BENZENE COMPOUNDS

Robert R. Dreisbach, Midland, Mich., assignor to The Dow Chemical Company, Midland, Mich., a corporation of Michigan No Drawing. Application September 10, 1941, Serial No. 410,264

5 Claims. (Cl. 260—669)

This invention concerns an improved method for the manufacture of divinyl-benzene compounds having the general formula:

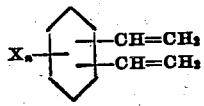

wherein X is hydrogen, or a halogen, e. g. chlorine or bromine, or a methyl or ethyl group, by the pyrolytic dehydrogenation of corresponding ethylated compounds. It particularly concerns the production of divinyl-benzene from diethyl-benzene and/or ethyl-vinyl-benzene.

Divinyl-benzene is known to polymerize very readily with formation of a transparent resin which is insoluble in benzene and other usual organic solvents. It is also known that the addition of a small proportion of divinyl-benzene to styrene followed by polymerization results in formation of a clear glass-like resin which is insoluble in solvents capable of dissolving polystyrene alone. Because of such properties, there are numerous uses to which divinyl-benzene would be adapted, provided that it could be manufactured at reasonable cost.

Of the several methods heretofore employed in preparing divinyl-benzene, most are inconvenient, expensive, and poorly suited to actual manufacture of the compound. Probably the most practical of these known methods is that of U. S. Patent 2,211,524, wherein it is reported that di-isopropyl-benzene may be demethylated to form divinyl-benzene, together with other compounds, by passage through a pyrolysis chamber under conditions such as to obtain at least 70 per cent of complete conversion per pass. The reaction to form divinyl-benzene which occurs in this process may be represented by the equation:

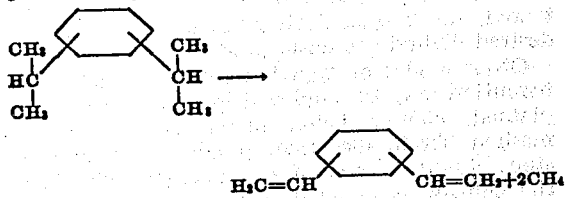

Although it should theoretically be possible to form divinyl-benzene from the less expensive and more readily available starting material, diethyl-benzene, by dehydrogenating the latter in accordance with the equation:

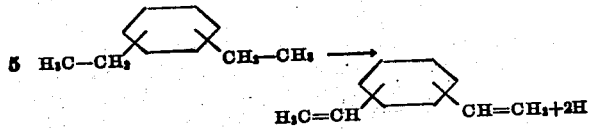

no method for successfully effecting this reaction has heretofore been known. To the contrary, it is repeatedly taught in the art that the principal vinyl aromatic compound obtainable by the pyrolytic dehydrogenation of diethyl-benzene is ethyl-vinyl-benzene, little if any divinyl-benzene being formed.

My researches have confirmed this teaching, i. e. I have found that when diethyl-benzene is pyrolyzed by usual methods, ethyl-vinyl-benzene is formed as the principal vinyl aromatic product, together in some instances with very small amounts of styrene and/or divinyl benzene. Not only was the yield of divinyl benzene almost negligible, but separation by distillation of the small amounts of divinyl-benzene sometimes formed is difficult and impractical. It is more difficult to separate divinyl-benzene by distillation from a pyrolysis mixture containing only a small concentration, e. g. less than 10 per cent by weight, of the same than from mixtures containing the compound in higher concentrations, since the prolonged heating required to fractionate divinyl-benzene from a mixture of low concentration usually causes polymerization.

Attempts to produce divinyl benzene in higher yield by pyrolyzing diethyl-benzene under more vigorous conditions, e. g. by raising the temperature or extending the time of reaction, failed and merely increased the amount of by-product formation. From these experiments, it appeared that the usual ethyl-vinyl-benzene product is too unstable to permit pyrolytic dehydrogenation of the same to form divinyl-benzene without excessive by-product formation. However, another possible explanation for the failure to obtain divinyl-benzene in substantial yield by the pyrolysis of diethyl-benzene would be that one or more of the products other than ethyl-vinyl-benzene, e. g. hydrogen, unreacted diethyl-benzene, ethyl-benzene, or benzene, etc., which ar present in the reacting mixture together with the ethylvinyl-benzene during its formation, might prevent further dehydrogenation of the ethyl-vinyl-benzene to form the desired divinyl-benzene product, e. g. by promoting or undergoing side reactions.

As a test to determine which of these possible explanations is correct, I prepared and pyrolyzed ethyl-vinyl-benzene and found, surprisingly, that it may readily be dehydrogenated to obtain divinyl-benzene in good yield. I further found that divinyl-benzene may be produced conveniently and in satisfactory yield from diethyl-benzene by first pyrolyzing the latter as usual to obtain ethyl-vinyl-benzene as the major vinyl aromatic product, concentrating the ethyl-vinyl-benzene together if desired with any divinyl-benzene present, and pyrolyzing the concentrated material. In the second of these pyrolysis steps, divinyl-benzene is formed in good yield and in a concentration sufficiently high to permit separation of the same from the reaction mixture by distillation.

The above-mentioned pyrolysis reactions may each be carried out at temperatures between 450° and 1000° C. employing any of the various procedures heretofore known for the pyrolysis of ethylbenzene to form styrene. The time of reaction, i. e. the time over which the material is maintained at a pyrolyzing temperature, should, of course, be restricted sufficiently so as to avoid appreciable carbonization. The employment of a very brief reaction period is particularly important when operating at temperatures above 700° C.

In practice, pyrolysis of the diethyl-benzene is preferably carried out by passing liquid or vaporized diethyl-benzene into admixture with steam which has been superheated sufficiently to provide the heat of pyrolysis. Usually steam heated to temperatures between 700° and 1200° C. is used in such proportion as to form with the diethyl-benzene a mixture having a temperature between 650° and 950° C. and the mixture so formed is cooled to below 650° C. within 1 second, and preferably within 0.25 second, after its formation. However, by operating at lower temperatures in the presence or absence of dehydrogenating catalysts or agents, such as sulphur, metal oxide catalysts, activated charcoal, etc., longer periods of reaction may be employed and immediate cooling of the reacted mixture is not imperative.

The vapor mixture produced by the pyrolysis of diethyl-benzene is cooled sufficiently to liquefy the aromatic reaction products and separate them from the gaseous mixture of hydrogen and lower aliphatic hydrocarbons, e. g. ethane, methane, ethylene, etc., also formed in the pyrolysis. The liquid condensate is fractionally distilled, preferably under vacuum and in the presence of a polymerization inhibitor such as sulphur or a polyhydric phenol, to obtain a fraction rich in ethyl-vinyl-benzene and which may also contain divinyl-benzene, if formed. This fractional distillation is carried out with sufficient care so that the concentration of "dehydrogenated diethyl-benzene," i. e. of ethyl-vinyl-benzene plus divinyl-benzene, in the fraction thus collected is at least 75 per cent my weight and preferably 90 per cent or more.

The concentrated ethyl-vinyl-benzene, which may contain minor amounts of divinyl-benzene and/or unreacted diethyl-benzene, etc., is pyrolyzed under conditions similar to those hereinbefore described for the initial pyrolysis of the diethyl-benzene, and the aromatic products of this second pyrolysis are condensed by cooling. The mixture so obtained contains divinyl-benzene as a major product, and the divinyl-benzene is present in high enough concentration to permit its separation by distillation. The distillation is carried out under vacuum and preferably in the presence of a substance such as sulphur, tertiary-butyl-catechol, or pyrogallol, etc. which serves to inhibit polymerization of the divinyl-benzene. Unreacted ethyl-vinyl-benzene or diethyl-benzene recovered in this distillation is recycled in the process for the production of additional divinyl-benzene.

The following example describes one way in which the principle of the invention has been employed, but it is not to be construed as limiting its scope.

*Example*

Diethyl-benzene was vaporized and passed in steady flow into admixture with a current of steam which had been superheated to about 800° C., the proportions of diethyl-benzene and steam being such as to form a mixture having a temperature of 700° C. The mixture thus formed was passed immediately through a bed of activated charcoal at such rate that the contact time, i. e. the time required for an integral portion of the mixture to traverse the bed, was only 0.025 second. The mixture was then cooled to condense the aromatic products and thus separate them from the hydrogen and other permanently gaseous reaction products. The condensate was analyzed and found to contain less than 1 per cent by weight of benzene, 3 per cent of styrene, 3.5 per cent of divinyl-benzene, 36 per cent of unreacted diethyl-benzene, and 48.4 per cent of ethyl-vinyl-benzene. It was fractionally distilled under vacuum to obtain a fraction consisting largely of the ethyl-vinyl-benzene. This fraction was pyrolyzed at a temperature of 725° C. under conditions otherwise similar to those employed in pyrolyzing the diethyl-benzene. The reaction mixture was cooled to condense the aromatic products. The condensate was found to contain approximately 2.8 per cent by weight of ethyl-benzene, 6.4 per cent of diethyl-benzene, 6.7 per cent of styrene, 41.7 per cent of ethyl-vinyl-benzene, and 38.8 per cent of divinyl-benzene.

The method just described is not limited to the production of divinyl-benzene from diethyl-benzene, but may also be applied in producing nuclear substituted divinyl-benzenes wherein the nuclear substituents are halogen or methyl or ethyl groups. For instance, it may be applied in making divinyl-ethyl-benzene from triethyl-benzene, in making divinyl-toluene from diethyl-toluene, in making divinyl-chlorobenzene from diethyl-chlorobenzene, in making divinyl-bromobenzene from diethyl-bromobenzene, in making divinyl-dichlorobenzene from diethyl-dichlorobenzene, etc. In all such instances, the starting compound is pyrolyzed to obtain a corresponding monovinyl aromatic compound which is concentrated, and is then itself pyrolyzed to obtain the desired divinyl aromatic product.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of making divinyl-benzene, the steps which consist in heating diethyl-benzene to a pyrolysis temperature for a time insufficient to cause substantial carbonization, whereby ethyl-vinyl-benzene is formed as the principal dehydrogenated diethyl-benzene product, separating the dehydrogenated diethyl-benzene from other products of the reaction to obtain it in a form of at least 75 per cent by weight concentration, and thereafter heating it at a pyrolyzing temperature for a time insufficient to cause substantial carbonization, whereby it is further dehydrogenated to form divinyl-benzene.

2. In a method for making a divinyl-benzene compound wherein a diethyl-benzene compound having the general formula,

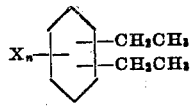

where X is a substituent selected from the group consisting of hydrogen, halogens, methyl and ethyl substituents, and $n$ is an integer not exceeding 4, is pyrolyzed to form a corresponding ethyl-vinyl-benzene compound and the pyrolysis mixture is cooled to obtain a condensate comprising the ethyl-vinyl-benzene compound diluted with other aromatic components of the mixture, the steps of fractionally distilling the condensate to obtain a fraction thereof containing at least 75 per cent by weight of the ethyl-vinyl-benzene compound, passing this fraction through a reaction zone at a rate of flow sufficient to prevent substantial carbonization while heating the mixture within said zone to a reaction temperature between 450° and 1000° C., and promptly cooling the reaction mixture as it flows from said zone.

3. In a method for making a divinyl-benzene compound wherein a diethyl-benzene compound having the general formula,

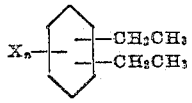

where X is a substituent selected from the group consisting of hydrogen, halogens, methyl and ethyl substituents, and $n$ is an integer not exceeding 4, is pyrolyzed to form a corresponding ethyl-vinyl-benzene compound and the pyrolysis mixture is cooled to obtain a condensate comprising the ethyl-vinyl-benzene compound diluted with other aromatic components of the mixture, the steps of fractionally distilling the condensate to obtain a fraction containing at least 75 per cent by weight of the ethyl-vinyl-benzene compound, vaporizing this fraction and passing the vapors into admixture with steam which is superheated to a temperature above 700° C. to form a pyrolysis mixture having a temperature between 650° and 950° C., and promptly thereafter cooling the mixture.

4. In a method for making divinyl-benzene wherein diethyl-benzene is pyrolyzed to form ethyl-vinyl-benzene and the pyrolysis mixture is cooled to obtain a condensate comprising the ethyl-vinyl-benzene diluted with other aromatic components of the mixture, the steps of fractionally distilling the condensate to obtain a fraction containing at least 75 per cent by weight of ethyl-vinyl-benzene, vaporizing this fraction and passing the vapors through a reaction zone at a rate of flow sufficient to prevent substantial carbonization while heating the vapors within said zone to a reaction temperature between 650° and 950° C., and promptly cooling the reaction mixture as it flows from said zone.

5. In a method of making divinyl-benzene wherein diethyl-benzene is pyrolyzed to form ethyl-vinyl-benzene and the pyrolysis mixture is cooled to obtain a condensate comprising the ethyl-vinyl-benzene diluted with other aromatic components of the mixture, the steps which consist in fractionally distilling the condensate to obtain a fraction containing at least 75 per cent by weight of ethyl-vinyl-benzene, vaporizing this fraction and passing the vapors into admixture with steam which is superheated to a temperature above 700° C. to form a pyrolysis mixture having a temperature between 650° and 950° C., and promptly thereafter cooling the mixture to a temperature below 650° C.

ROBERT R. DREISBACH.